(12) United States Patent
Zuili

(10) Patent No.: US 8,666,065 B2
(45) Date of Patent: Mar. 4, 2014

(54) REAL-TIME DATA ENCRYPTION

(75) Inventor: Patrick Joseph Zuili, Boca Raton, FL (US)

(73) Assignee: Britesmart LLC, Boca Raton, FL (US)

( * ) Notice: Subject to any disclaimer, the term of this patent is extended or adjusted under 35 U.S.C. 154(b) by 370 days.

(21) Appl. No.: 13/031,649

(22) Filed: Feb. 22, 2011

(65) Prior Publication Data

US 2011/0142230 A1 Jun. 16, 2011

Related U.S. Application Data

(63) Continuation-in-part of application No. 10/360,270, filed on Feb. 7, 2003, now Pat. No. 8,213,601.

(51) Int. Cl.
 H04K 1/00 (2006.01)
 H04L 9/00 (2006.01)
 H04L 9/32 (2006.01)
 G06F 21/00 (2013.01)
 G06F 3/00 (2006.01)

(52) U.S. Cl.
 USPC .............. 380/28; 713/176; 713/186; 715/742

(58) Field of Classification Search
 USPC ................. 713/150–154, 160–167, 168–174, 713/189–193, 182–186, 202; 380/28–30, 380/255–283; 709/225, 229; 726/2–8
 See application file for complete search history.

(56) References Cited

U.S. PATENT DOCUMENTS

| | | | |
|---|---|---|---|
| 4,987,550 A | 1/1991 | Leonard et al. | |
| 5,220,606 A | 6/1993 | Greenberg | |
| 5,539,827 A | 7/1996 | Liu | |
| 5,680,452 A | 10/1997 | Shanton | |
| 5,809,140 A | 9/1998 | Rubin et al. | |
| 6,049,608 A | 4/2000 | Ablowitz et al. | |
| 6,178,243 B1 | 1/2001 | Pomerantz et al. | |
| 6,640,303 B1 | 10/2003 | Vu et al. | |
| 6,970,259 B1 * | 11/2005 | Lunt et al. | 358/1.14 |
| 7,016,497 B2 | 3/2006 | Henson et al. | |
| 7,069,591 B1 | 6/2006 | Weicher et al. | |
| 7,194,624 B1 | 3/2007 | Harris et al. | |
| 2002/0022953 A1 * | 2/2002 | Bertolus et al. | 704/1 |
| 2002/0095604 A1 | 7/2002 | Hausler et al. | |
| 2002/0112183 A1 | 8/2002 | Baird et al. | |
| 2002/0159588 A1 | 10/2002 | Kauffman | |
| 2004/0025118 A1 * | 2/2004 | Renner | 715/542 |

OTHER PUBLICATIONS

Aziz et. al. "Design and implementation of SKIP", 1995, pp. 1-12.

* cited by examiner

*Primary Examiner* — Evans Desrosiers

(57) ABSTRACT

A system and a method for real-time encryption of input data are described. A character numerical value associated with the input data is encrypted. The encoded character numerical value is then associated with a glyph corresponding to the input data. The encoded character numerical value and the glyph are then stored in a database. The encoded character numerical value is further encrypted using an encryption key to obtain an encrypted encoded character numerical value.

35 Claims, 3 Drawing Sheets

REAL-TIME DATA ENCRYPTION

"The present application is a continuation-in-part of U.S. application Ser. No. 10/360,270 filed on Feb. 7, 2003 now U.S. Pat. No. 8,213,601. The above mentioned application describes a method and system for font level encryption. The present application provides an improved system and method for the same. Although the present application uses terminologies different from the above mentioned application, the above mentioned application is incorporated by reference herein in its entirety."

FIELD OF INVENTION

The present subject matter relates, in general, to encryption of data and in particular to encryption of data in real-time.

BACKGROUND

Recent enhancements in computing and communication capabilities of various computing systems have made it easy to access and process large amount of data over a network. Further, the World Wide Web makes it easy for the data to be accessed and collected from anywhere in the world. Such wide-spread reach and easy access to the data, especially confidential and personal documents, has led to security concerns and privacy issues. Additionally, the data stored in a storage device, which may or may not be accessed over a network, may also be vulnerable to unauthorized access. In order to protect such data from being accessed and/or misused by an unauthorized personnel, variety of protection techniques have been implemented.

Conventional protection techniques typically include encrypting data recorded in a document before being stored in the storage device or being transmitted over the network. Encryption may be defined as the process of transforming data (also referred to as plaintext) using an algorithm (called cipher) to an encrypted data unreadable to anyone except those possessing special password, usually referred to as a key. Upon encryption, in order to access data contained in the document, decryption of the document is performed. Decryption, may be defined as reverse process of the encryption to make the encrypted data unencrypted, i.e., readable again.

Typically such protection techniques involve encryption of the document or a part of the document in its entirety using a single code. However, the encryption based on the single code often makes such protection techniques vulnerable to hacking Further, as the encryption is performed only after the data has been recorded in the document, an unauthorized user may access the data before being encrypted, for example, during the time when the data is being recorded on the document.

SUMMARY

This summary is provided to introduce concepts related to encryption of input data in real-time, which is further described below in the detailed description. This summary is not intended to identify essential features of the claimed subject matter nor is it intended for use in determining or limiting the scope of the claimed subject matter. This summary is provided to introduce a selection of concepts in a simplified form.

A system and a method for real-time encryption of input data are described herein. In one implementation, a character numerical value associated with the input data is encrypted. The encoded character numerical value is then associated with a glyph corresponding to the input data. The encoded character numerical value and the glyph are then stored in a database. The encoded character numerical value is further encrypted using an encryption key to obtain an encrypted encoded character numerical value associated with the input data, thus encrypting the input data.

These and other features, aspects, and advantages of the present subject matter will be better understood with reference to the following description and appended claims.

BRIEF DESCRIPTION OF DRAWINGS

The above and other features, aspects and advantages of the subject matter will be better understood with regard to the following description, appended claims, and accompanying drawings, where:

DETAILED DESCRIPTION

Figure 1:
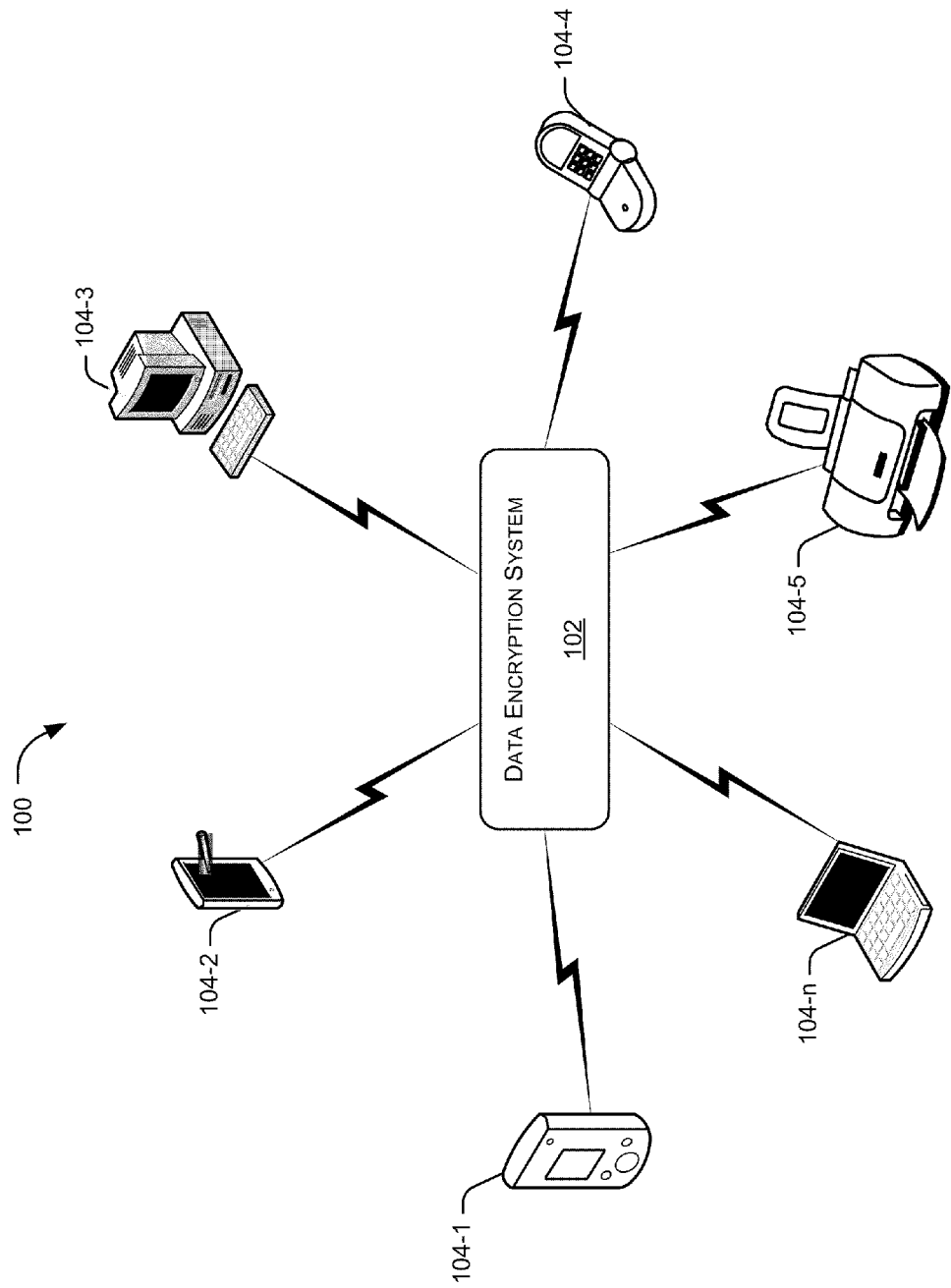
FIG. 1 illustrates a network environment implementing a data encryption system, according to an embodiment of the present subject matter.

The present subject matter relates to systems and methods for real-time encryption of input data. In one implementation, systems for encrypting data may be implemented in a variety of computing devices, such as a mobile device and a laptop. In another implementation, methods for encrypting data may be embodied on a CRM.

Advent of mass storage devices together with enhancements in computing and communication capabilities of various computing systems and devices has made it easy to access and process large amount of data contained in documents, which could contain confidential and/or personal information. This has led to security concerns and privacy issues for data especially in computing environments where a plurality of terminals are connected to a host computer via communications networks, or where data, processed in daily jobs, is stored in a mass storage device that can be transported from one place to another.

Further, in business activities, data security is a serious concern because of confidential nature of the contents of the documents. Since there is always a risk that such documents might be accessed by unauthorized users, protection techniques are commonly used to protect information, being sent over a network or saved in the storage device, from unauthorized access.

Conventional protection techniques typically include encrypting a document before being stored in the storage device or being transmitted over the network. Encryption involves transforming data (also referred to as plaintext) using an algorithm (called cipher) to an encrypted data (also referred to as cipher text), unreadable to anyone except those possessing a password. A person accessing the document then needs to decrypt the document before being able to access data contained in the document. Decryption, may be defined as reverse process of the encryption to make the encrypted data unencrypted, i.e., readable again.

Typically, data to be stored or transmitted is generated based on an input provided by a user. For example, the user may provide input data using an input device, such as, a keyboard. As the user types, say, a character from the keyboard, a scan code corresponding to character is transmitted to a data generating module of the computing device. The data generating module then generates characters based on a character numerical value (CNV) and a glyph associated with the character. An example of CNV includes ASCII codes which define a numerical representation of a character such as 'a', '@' or like. For instance, 65 in ASCII codes represents the character 'A'.

The glyph can be understood to be a graphical representation of a character, for example, first letter of English alphabet system, i.e., is graphically represented by 'A' in uppercase and by 'a' in lowercase. Further, the glyph may also be defined as graphical representation in a particular typeface. A typeface is indicative of the style, for example, regular, italics, bold italic, and bold, or the design of characters based on a font, such as, Arial, Times New Roman, and Calibri. For example, an italic version of the "Times New Roman" font family is a typeface and a bold version of the "Times New Roman" font family is another typeface. As will be appreciated, a character may thus have a different glyph for a different typeface. Additionally, a typeface may also contain more than one glyph for each character.

Referring back to example of generation of characters using the keyboard as the input device, when the user types any character, for example, the letter 'A' the data generating module determines the CNV, i.e., 65 in case of ASCII codes, and the glyph 'A' associated with the letter A in uppercase, to generate the required character, i.e., the letter A. The generated character is then recorded in the document. Further, all generated characters are recorded in the same sequence in which they have been typed in by the user, thus forming the document.

The document or a part of the document thus formed can then be encrypted using an encryption algorithm. The encryption algorithm encrypts the document or a part of the document using a single code and generates a key using which the person may decrypt the document to access the data written in the document. For example, a person intending to save his bank account details in an encrypted form in his laptop, first needs to write the bank details on a document, say a word document. The word document, when prepared, can then be encrypted using an encryption algorithm and saved in the laptop. The encryption algorithms usually follow a pattern of encryption using which they replace a character with another character. For example, a first character may be replaced by a second character that comes 6 places after the first character in the alphabetical order or each numeral may be replaced by its square. Similar method may also be used to encrypt documents already saved in the laptop or received from an external media, such as a portable drive or a device connected through a network interface.

However, such encrypted documents are vulnerable to unauthorized access or can be hacked. Further, few protection techniques provide methods for dividing a document into one or more segments and encrypting each of the segment using different codes. Although such methods make the decryption process complex; however for decrypting the entire document, an unauthorized user may either access the code of each part of the document or decipher the pattern of encryption for each part. Further, an authorized user may access the data even while the data is being recorded in the document.

The present subject matter describes systems and methods for real-time encryption of input data. In one implementation, input data provided by a user is encrypted before being recorded or represented in a document, such as a word processing document, spreadsheets, graphical-user interfaces, etc. For the purpose of explanation, the input data provided by the user may be a character, although other data may also be provided as the input data. Further, the examples provided in the description are for the mere purpose of explanation and should not be construed as a limitation. Each character, for example, an alphanumeric character, a punctuation mark, and a special character can be encrypted individually before being represented as an encrypted text, i.e., before forming a plain-text in the document. Thus, contents of the document are encrypted even before the document is formed.

In one embodiment, the data encryption system may be implemented within a cellular mobile device, or a computing device, such as a laptop, a computer. In said embodiment, the data generating module may be integrated with the data encryption system. In another embodiment, the data encryption system may be implemented as a plug-in device, for example, an mp3 player interfaced with a computing device. In said embodiment, the data generating module may be external to the data encryption system and integral to the computing device to which the data encryption system is interfaced. Further, methods for encrypting data may be embodied on a computer readable medium, such as a compact disk.

In one implementation, the character, generated by the data generating module, along with its associated CNV is dynamically encrypted to generate an encrypted CNV. In one implementation, the CNV is encoded using at least an encoding value, for example, a numerical value to generate an encoded CNV. Further, if a particular character is repeated in a document, the CNV of the particular character in both the instances may be encoded to a different CNV value.

Subsequent to encoding of the CNV, the encoded CNV is associated with the glyph corresponding to the character. The encoded CNV is associated with the glyph in real-time for streaming encryption of the character on the fly. Further, the encoded CNV and the associated glyph may be stored in a storage medium.

The encoded CNV is further encrypted using an encryption key to obtain an encrypted encoded CNV. Once the encrypted encoded CNV is generated, a glyph corresponding to the encrypted encoded CNV is recorded in the document as the encrypted character. Further, as a CNV is encoded to a different value each time, thus, the CNV for the character 'A' is encrypted to a different value each time the character 'A' is typed in the document by the user.

The system thus encrypts the input data as it is being typed by the user in a document in a manner similar to described above. The system simultaneously encrypts the input data provided by the user, i.e., the system provides for real-time encryption of the input data to maintain privacy and confidentiality of the input data. The document thus prepared will have all the characters in an encrypted form. For example, for the character 'A' the CNV, say, '65' according to ASCII codes, may be encoded and subsequently encrypted to provide the encrypted encoded CNV, say, 125. Thus the character 'A', according to the present example, will be represented as '}', this is because the ASCII code '125' corresponds to the glyph '}'. Similarly the character 'A' when typed for a second time, according to the above given example, may be represented using some other glyph, say, '='.

Thus a character can be represented using a different glyph every time, making it complex for an unauthorized user trying to decipher the document. Further, each time a new document is created the encoding of a CNV of a character will be done using a different encoding value, thus generating a different encoded CNV. This in turn would lead to a different value of encrypted encoded CNV due to which a character would always be represented by a different glyph in different document, thereby making encryption of the documents effective and robust against any kind of unauthorized access.

Further, in order to decrypt the encrypted document, a decryption key may be provided to an authorized user. On receiving the decryption key the encrypted characters are decrypted to provide the characters in their original glyph. Therefore, in the example considered above, encrypted characters "}" and "=" appear as "A" in the decrypted document.

Thus, the system encrypts the input data on the fly to provide a document containing encrypted data that has been encrypted even before the document is created. The system provides a double layer of security since the input data is first encoded and then encrypted to generate the encrypted input data. Owing to provision of the double layer protection, the decryption of the encrypted data is complex, thereby protecting the data from malafide actions.

Although the present system has been described in reference to encryption of characters before being recorded in a document, it will be understood that the system may be used for encryption of other input data, for example, a graphical image, a portion of a graphical image, a sequence of characters, a sequence of graphical images, and a portion of a document. It will also be understood that each of the other input data is associated with a glyph and a character numerical value.

Further, the input of data has been explained with reference to a keyboard; however it will be understood that data may be inputted via any other input device. Examples of other input device include, but are not limited to, a mouse, a virtual keyboard, a microphone used for providing voice commands, a scanner, or a graphical image or text copied from a file.

The manner in which the system for dynamically encrypting input data is implemented shall be explained in detail with respect to the figures. While aspects of systems and methods can be implemented in any number of different computing systems, environments, and/or configurations, the embodiments are described in the context of the following exemplary system architecture(s).

FIG. 1 illustrates a network environment 100 implementing a data encryption system 102 for real-time encryption of input data, according to an embodiment of the present subject matter. The data encryption system 102, hereinafter referred to as the system 102, is configured to encrypt the input data in real-time, i.e., before being recorded in a document. In other words, encryption of data occurs simultaneously with the input of data. The system 102 communicates with one or more user device(s) 104-1, 104-2, 104-3, 104-4, 104-5, ..., 104-n, hereinafter referred to as user device(s) 104. Examples of the user device 104 include, but are not limited to, computing device such as mainframe computers, workstations, personal computers, desktop computers, minicomputers, servers, multiprocessor systems, and laptops; a cellular communicating device such as a personal digital assistant, a smart phone, and a mobile phone; and a printing device.

In one embodiment, the system 102 may be any computing device for instance, mainframe computers, workstations, personal computers, desktop computers, multiprocessor systems, laptops, network computers, minicomputers, servers, and a cellular mobile device, such as a personal digital assistant, a smart phone, a mobile phone. In said embodiment, the system 102 may communicate with the user device(s) 104 over a network (not shown in the figures). The network may be a wireless network, a wired network, or a combination thereof. The network can also be an individual network or a collection of many such individual networks, interconnected with each other and functioning as a single large network, e.g., the Internet or an intranet. In another embodiment, the system 102 may be implemented as a plug-in device, for example, an mp3 player, which may be interfaced with the user device(s) 104.

The system 102 is configured to encrypt input data, for example, a character before the input data is recorded in a document, such as a word file, notepad, an excel sheet, and an application program, such as an application for textual and graphical processing. For the purpose of explanation, the input data is described with reference to a character, although other data may also be provided as the input data. Each character, for example, an alphanumeric character, a punctuation mark, and a special character is encrypted individually before being represented as an encrypted text or before forming a plaintext in the document. Thus, action of encryption of the content occurs concurrently with the input of content. In one embodiment, in response to input of data, encrypted data is represented in the document. In another implementation, in response to input of the data, the original glyph appears in the document and when the document is accessed again, encrypted data appears in the document.

The character to be encrypted may be provided to the system 102 via an input device, such as, a keyboard interfaced with the user device 104. In response to the input of character typed using the keyboard, a scan code corresponding to the character is transmitted to the user device 104. The user device 104 identifies character values, i.e., a character numerical value (CNV) associated with the character and a glyph associated with the character using the scan code. The CNV is then provided to the system 102 that encrypts the input data in real-time. In one implementation, the CNV may be, for example, an alphanumeric value, a small discrete unit used by an application for textual and graphical processing, an American standard code for information interchange (ASCII) code, an ANSI code, a packetized communication, and a frame-based transmission. Further, the application for textual and graphical processing may include an instant messaging application, a short message service application, a multimedia messaging service application, an email application, and a web page based application. The system 102 is thus configured to encrypt textual data associated with an application program, such as the application for textual and graphical processing in a streaming format.

For example, when the user types any character, for example, the letter 'a' from the keyboard, the keyboard transmits the scan code corresponding to the letter 'a' to the user device 104. The user device 104 identifies the CNV, i.e., 97 in case of ASCII codes and the glyph 'a' associated with the letter 'a' in lowercase and provides the same to the system 102, that encrypts the character, in present example, 'a' in real-time.

In one implementation, the system 102 encodes the CNV, using at least an encoding value, for example, a numerical value to generate an encoded CNV. For example, for the character 'a', the system 102 may encode the CNV, i.e., the corresponding ASCII code '97' to any other value, say '120.169800', which now becomes the encoded CNV of the character 'a'. The encoded CNV is then associated with the glyph corresponding to the character. In one implementation, the system 102 uses a dynamic table to associate the CNV with the glyph.

The encoded CNV is further encrypted using an encryption key to obtain an encrypted encoded CNV. For example, the encoded CNV '120.169800' will be encrypted using the encryption key to obtain any other value, say '125' which now becomes the encrypted encoded CNV. Once the encrypted encoded CNV of the character is generated, a glyph corresponding to the encrypted encoded CNV is recorded in the document as the encrypted character.

The system 102 thus encrypts all the characters, as they are being typed by the user in a document and stores the document in a storage medium. The document thus prepared will have all the characters in an encrypted form. Referring to the example mentioned in the previous paragraph, character 'a' having the encrypted encoded value as "125", will be represented as a glyph corresponding to ASCII value 125, which is '}'.

In one implementation, each time a similar character is inputted, the system 102 encrypts the character to a different value. Thus, in the above example, when the character 'a' is typed for the second time the system encrypts the CNV 97 to some other encrypted encoded value, say, 61. The character 'a' when typed for the second time, according to the above given example, will thus be represented as '='. Thus, a character will be represented using a different glyph every time, making it complex for an unauthorized user to decipher the document.

Further, each time a new document is created, the encoding of a character may be done using a different encoding value, thus generating a different encoded CNV for the character. This in turn would lead to a different value of encrypted encoded CNV due to which a character would be represented by a different glyph in different documents. Thus, decryption of encrypted data in one document will not provide for decryption of the data in other document as well.

In one implementation, different sections of the input data may be encrypted in different typefaces.

In said implementation, a user intending to encrypt different sections of the input data in different typefaces may first select the typeface from a list of typefaces available in the user device 104. The input data provided by the user will then be encrypted in the selected typeface. The user, on completing one section of the input data, may then select another typeface and start providing the input data to the system. The system 102 then encrypts the input data in the selected typeface.

For example, a user who wants to send a document having his name, personal details and bank account details to his accountant in such a way that the accountant can see all the details, the accountant's assistance can see only the name and personal details, and a third person can see only his name, may prepare a single document with both the personal details and the bank account details encrypted in different typefaces. The personal details may be written in the typeface 'Italics Arial', whereas the bank account details may be written in the typeface 'Italics Times New Roman'. Encrypting different sections of the input data using different typefaces makes it convenient for an intended authorized recipient of the document to identify the section of the input data intended for the recipient. In the above example, the authorized user when decrypting the document needs to select the typeface in which the input data intended for him is written. The system 102 on receiving the command for the selected typeface may then decrypt the data written in the selected typeface.

In another implementation, the system 102 may also be configured to encrypt different sections of the input data using different encryption keys. Thus in the above example, the personal details may be encrypted using a first encryption key, whereas, the bank account details may be encrypted using a second encryption key. Encrypting different sections of the input data using different encryption keys helps in ensuring that an authorized recipient of the document decrypts the section of the input data intended for the authorized recipient. In addition it saves the user form the hassle of preparing different documents for different recipients.

Further, the system 102 may be configured to encrypt only a particular section of the input data. Such a partial encryption makes the system 102 useful in applications, such as mobile or internet banking, secure payment transactions, or similar applications, where a user may desire to provide certain private information, such as bank id and password in an encrypted form. Using the system 102 for encryption of data, relating to such applications and other similar web based transactions, secures data from any sort of online attacks and frauds, for example, phishing, pharming, keystroke logging, session hijacking, and Trojan horses.

For example, during an internet banking transaction a user may connect the user device 104 to the system 102 and then start enter his personal information such as name, credit card number, shipping address and billing address. The system 102 encrypts the personal information in real-time, such that personal information appears in an encrypted form in the web browser of the bank's server. The bank's server may implement the system 102 and accordingly when a user enters his personal information in an encrypted form, bank's server may then decrypt the personal information.

In one embodiment, the system 102 may be configured to encrypt the input data in different modes to provide full digital rights management control. In a first mode, for example, the system 102 may be configured to encrypt the input data in a document such that only an authorized user may decrypt the document using a decryption key.

In a second mode, for example, the system 102 may be configured to encrypt the input data in a document such that any user may read the document by making a read request to the system 102. The system 102 in said mode will decrypt the document without having user to provide the decryption key. The system 102, however, may be configured to obtain identification details, for example, IP address of a remote user device 104, or any identification parameters stored in the user device 104 and store the same in the system 102 or any remote database in communication with the system 102.

In a third mode, for example, the system 102 may be configured to decrypt the document without having the user to provide the decryption key, obtain the identification details of the user device 104, and prevent the user of the user device 104 from using any digital rights, for example, clipboard function such as cut, copy, paste, drag, drop, and print. The system 102 may be configured to work in any of the first mode, the second mode, the third mode, or any combination thereof.

In order to decrypt a decryption key can be provided to an authorized user. The authorized user may decrypt the characters in the document based on the decryption key whenever the document is to be accessed or read. For the purpose, the authorized user needs to connect the user device 104 to the system 102, select the document, and provide the decryption key to the system 102. On receiving the decryption key, the system 102 decrypts the characters such that the glyphs seen in the document are decrypted to present glyphs originally associated with the characters and the encrypted character is readable as plain text data.

Although the present system 102 has been described in reference to encryption of characters in a text format, it will be understood that the system may be used for encryption of other input data, for example, a graphical image, a portion of a graphical image, a sequence of characters, a sequence of graphical images, a voice command, and a portion of a document. In case of a graphical image CNV may be a numerical data, for example, RGB values according to the RGB color model corresponding to the graphical image. Further, the characters, as described here in, may correspond to letters used in alphabets of any language.

Further, the input of data has been explained with reference to a keyboard; however it will be understood that data may be inputted via any other input device Examples of other input device include, but are not limited to, a mouse, a virtual keyboard, a microphone used for providing voice commands, a scanner, or a graphical image or text copied from a file.

Figure 2:
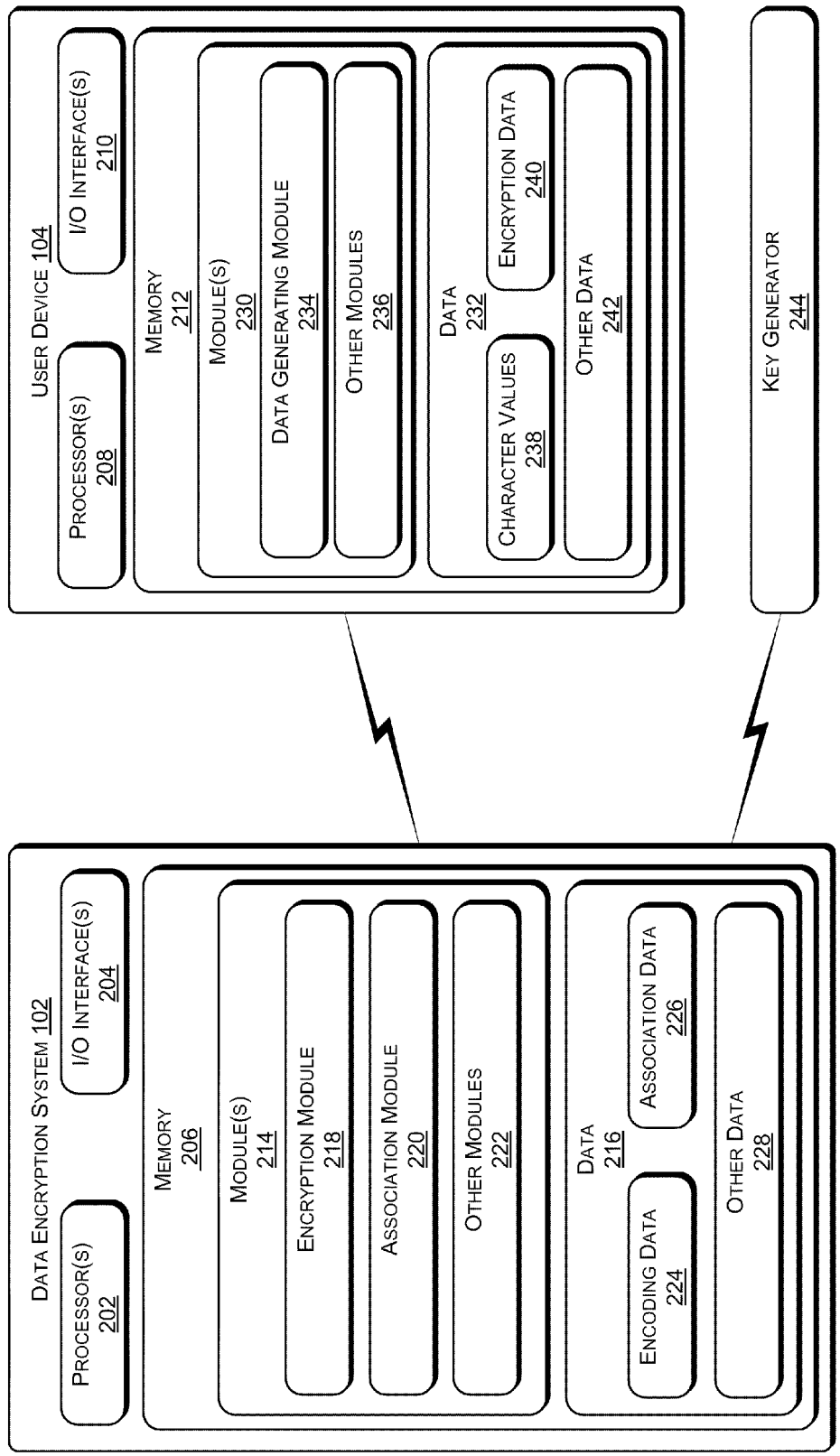
FIG. 2 illustrates components of a data encryption system in communication with a user device, according to an embodiment of the present subject matter.

FIG. 2 illustrates exemplary components of the system 102 in communication with the user device 104, according to an embodiment of the present subject matter. The system 102 includes one or more processor(s) 202, I/O interface(s) 204, and a memory 206, similarly the user device 104 includes one or more processor(s) 208, I/O interface(s) 210, and a memory 212. The processor(s) (202, 208) can be implemented as one or more microprocessors, microcomputers, microcontrollers, digital signal processors, central processing units, state machines, logic circuitries, or any devices that manipulate signals based on operational instructions. Among other capabilities, the processor(s) (202, 208) are configured to fetch and execute computer-readable instructions and data stored in the memory (206, 212).

The I/O interfaces (204, 210) may include a variety of software and hardware interfaces, for example, interfaces for peripheral device(s) such as a keyboard, a mouse, an external memory, a printer, etc. Further, the interfaces (204, 210) may enable the system 102 and the user device 104, respectively to communicate with each other and other computing devices, such as web servers and external databases. The I/O interfaces (204, 210) may facilitate multiple communications within a wide variety of networks and protocol types, including wired networks (e.g., LAN, cable, etc.) and wireless networks (e.g., WLAN, cellular, satellite, etc, such as the network environment 100. In one implementation, the I/O interfaces (204, 210) may include one or more ports for connecting to a number of computing devices over a network. For instance, the I/O interfaces 204 may facilitate the system 102 in communicating with the user device(s) 104 over a network. The I/O interfaces (204, 210) may further facilitate interfacing between the system 102 and the user device 104, for example, when the system 102 is a plug-in device.

The memory (206, 212) may be implemented as any computer-readable medium known in the art including, for example, volatile memory (e.g., RAM) and/or non-volatile memory (e.g., flash, etc.).

In one implementation, the memory 206 includes module(s) 214 and data 216. In an embodiment, the module(s) 214 include an encryption module 218, an association module 220, and other modules 222. The other module(s) 222 include programs that supplement applications implemented by the system 102. The data 216 serves as a repository for storing data processed, received, and generated by the module(s) 214. In one implementation, the data 216 includes encoding data 224, association data 226, and other data 228. The other data 228 includes data that is generated as a result of the execution of one or more programs in the other modules 222.

Further, the memory 212 includes module(s) 230 and data 232. In an embodiment, the module(s) 230 include a data generating module 234, and other modules 236. The other module(s) 236 include programs that supplement applications implemented by the user device 104. The data 232 serves as a repository for storing data processed, received, and generated by the module(s) 230. In one implementation, the data 232 includes character values data 238, encryption data 240, and other data 242. The other data 242 includes data that is generated as a result of the execution of one or more programs in the other modules 236.

As described previously, when a user provides the input data, for example, a character using an input device, such as a keyboard interfaced with the user device 104, the scan code corresponding to the character is transmitted to the user device 104. The data generating module 234 receives the scan code and identifies the character values associated with the character. For the purpose, the data generating module 234 accesses the character values data 238 to identify the CNV corresponding to the received scan code. Based on the identified CNV, the data generating module 234 identifies the glyph associated with the character. In one implementation, the data generating module 234 identifies the glyph based also on the typeface selected by the user. Based on the CNV and the glyph, the data generating module 234 generates the character that the user intends to encrypt. The character, generated by the user device 104, along with their associated CNV are then used by the system 102 to encrypt the character in real-time.

In one embodiment, the encryption module 218 of the system 102 is configured to encrypt the character in real-time. The encryption module 218, on receiving the CNV randomly assigns an intermediary encoding value corresponding to the CNV. In one implementation, the intermediate encoding value may be a random value or a pseudo random value. The CNV and the intermediary encoding value are then stored in the encoding data 224. The encryption module 218 further generates an encoding matrix based at least on the intermediate encoding value and a relative position of the character in a document. The relative position of the character may be defined as the number of times the character has occurred in the document and may be determined based on the first occurrence of the character in the document. In one implementation, when encrypting the character, say an alphabet, the encryption module 218 may also determine the position of a particular letter in alphabetical series. For instance, in English alphabets, the letter 'a' has position 1, similarly the letter 'b' has the position 2, and the letter 'z' has the position 26.

The encryption module 218 then generates an encoding sequence, for example, a series of prime numbers, a series of random numbers, and a part of a transcendental number for encoding the CNV. For instance, the encryption module 218 may generate the PI series, i.e., (3.14159265358979. . . ) or the series of prime numbers (2357111317192329. . . ) and uses a part from the generated series as the encoding sequence. The encryption module 218 selects the encoding sequence and based on the encoding sequence and the encoding matrix generates an encoding value. The encoding value along with the intermediate encoding value may then be used by the encryption module 218 to encode the CNV to generate the encoded CNV.

For example, when the user needs to prepare a document having some encrypted data, for example, the word 'association' the user starts typing the characters in the order of their occurrence in the word. The user thus first types the letter 'a' from the keyboard. The data generating module 234 identifies the CNV, i.e., '97' in case of ASCII codes and the glyph 'a' associated with the letter 'a' in lowercase. The encryption module 218 then assigns an intermediary encoding value, say a random value '120' corresponding to the CNV. The encryption module 218 then determines the number of times the letter 'a' has occurred in the present document and thus identifies the relative position as '1' when the letter 'a' is typed for the first time. Similarly when the letter 'a' is typed for the second time, the encryption module 218 identifies the relative position as '2'. The encryption module 218 then generates an encoding matrix, say, '120(1,1)' based on the intermediate encoding value '120', the relative position, i.e., '1', and the position in the alphabetical series, i.e., '1'.

The encryption module 218 then generates an encoding sequence, say, the sequence '1415' from the PI series, i.e., (3.14159265358979...). Based on the encoding matrix '120 (1,1)' and the encoding sequence '1415' the encryption module 218 generates the encoding value, i.e., '169800'. The encryption module 218 then generates the encoded CNV, say '120.169800', based on the encoding value '169800' and the intermediate encoding value '120'.

Further, if the particular character is repeated in a document, the CNV of the particular character in both the instances will be encoded to a different value. For example, when the character 'a' is typed again by the user, the data encryption system may encode the CNV, i.e., '97' according to ASCII codes to any other value, say, '120.499080'.

The encoded CNV along with the intermediate encoding value, the encoding matrix, the encoding value, and the encoding sequence are stored in the encoding data 224. The association module 220 associates the encoded CNV with the glyph associated with the character, the corresponding CNV of which had been encoded by the system 102. For example, the encoded CNV, i.e., 120.169800 in the above example will be associated with the glyph, i.e., 'a'. In one implementation, the association module 220 uses a dynamic table to associate the CNV with the glyph. The association module 220 generates the dynamic table based on the intermediate encoding value, the encoding matrix, the encoding value, the encoding sequence, and the glyph associated with each character. The association module 220 may then store the dynamic table in the association data 226. The association module 220 is configured to associate the encoded CNV with the glyph in real-time for streaming encryption of the character on the fly. The encoded CNV and the associated glyph are then stored in a storage medium integral or external to the system 102, for example, in the association data 226 or the encryption data 240.

The encoded CNV is further encrypted using an encryption key to obtain the encrypted encoded CNV. The system 102, in one embodiment, communicates with a key generator 244 configured to generate the encryption key. In another embodiment, the key generator may be integral to the system 102 or the user device 104. The key generator 244 may use any available user related data, for example, security data obtained from a database, such as smartcard data, biometric data, a security identifier (SID), and password protection data to generate the encryption key. Further, the key generator 244 is configured to use any known key generation algorithm to generate the encryption key. The key generator 244 is thus configured to generate encryption keys of various types, for example a symmetric key, an asymmetric public key, an asymmetric private key, and streaming encryption algorithm key. The encryption module 218 uses the encryption key to generate the encrypted encoded CNV. The encrypted encoded CNV may then be stored in the encryption data 240.

For example, the encoded CNV '120.169800' in the above example will be encrypted using the encryption key to obtain any other value, say '125' which now becomes the encrypted encoded CNV. Similarly the encoded CNV '120.499080' in the above example will be encrypted using the encryption key to obtain any other value, say '61'. Thus the CNV for the character 'a' is encrypted to a different value each time the character 'a' is typed in the document by the user.

The system 102 thus encrypts all the characters, as they are being typed by the user in a document and stores the document in the storage medium. The document thus prepared will have all the characters in an encrypted form. For example, the character 'a' when typed for the first time, according to the above given example, will be represented as '}', this is because the ASCII code '125' corresponds to the glyph '}'. Similarly the character 'a' when typed for the second time, according to the above given example, will be represented as '='. Thus, a character will be represented using a different glyph every time, making it complex for an unauthorized user trying to decipher the document.

Further, the encryption module 218 may use any known encryption functions, for example, a public key infrastructure (PKI) and an identity based encryption function for encrypting the encoded CNV. PKI may be defined as an arrangement that binds the encryption key, also known as public keys, with respective user identities of the user sending data, i.e., a sender and the user receiving the data, i.e., a receiver by means of a certificate authority (CA). A user identity must be unique within each CA domain. The binding of the user identity and its encryption key is established through a registration and issuance process, which may be carried out by software at the CA, or under human supervision. The binding of the user identity and its encryption keys are maintained and assured by a Registration Authority (RA). For each user, the user identity, the encryption key, their binding, validity conditions and other attributes are maintained in public key certificates issued by the CA.

Identity-based cryptography is an implementation of PKI in which a publicly known string representing an individual or an organization is used as an encryption key. The publicly known string may be an email address, domain name, or a physical IP address, etc. Identity-based systems allow any party to generate the encryption key from a known identity value such as an ASCII string. A trusted third party, called the Private Key Generator (PKG), generates corresponding private keys, i.e., the decryption keys. A decryption key is available only to the authorized user to decrypt the messages encrypted with the encryption key.

As described previously, the authorized user may decrypt the characters in the document by providing a decryption command to the user device 104 such as a computing device, a cellular communicating device, and a printing device. For example, the authorized user may provide the decryption key to the user device 104 which in turn transmits the decryption key to the system 102. On receiving the decryption key, the encryption module 218 decrypts the characters such that the glyphs seen in the document are decrypted to present glyphs originally associated with the characters due to which the encrypted character is readable as plain text data. In one implementation, the encryption module 218, on receiving the decryption key, separates the associated glyph and the encoded CNV and presents the glyph in the document.

Although the present system has been described with reference to a computing device external to a user device, it will be understood that the system may be integral with the user device.

Figure 3:
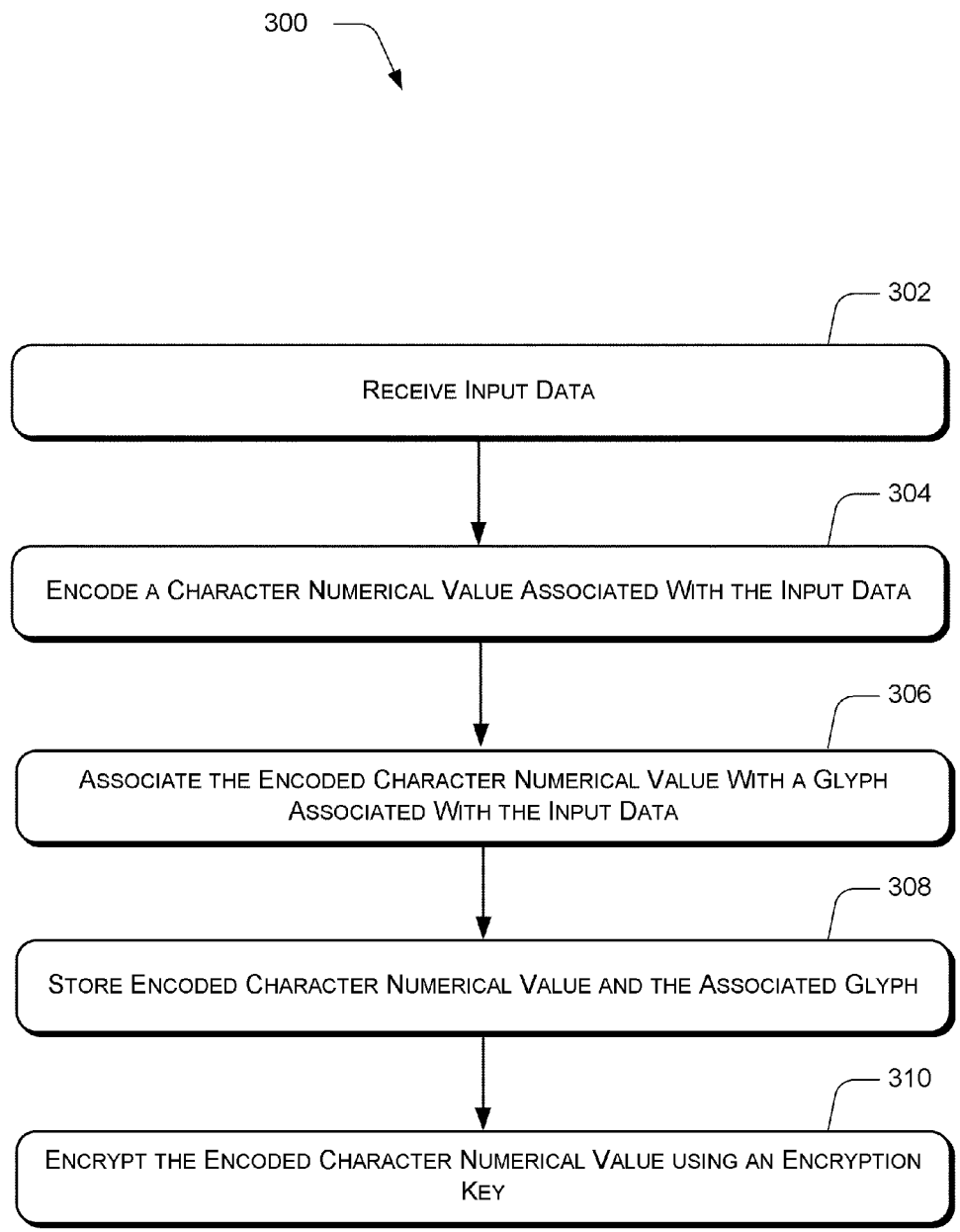
FIG. 3 illustrates a method for encrypting input data in real-time, according to an embodiment of the present subject matter.

FIG. 3 illustrates an exemplary method 300 for encrypting input data in real-time, according to an embodiment of the present subject matter. The method 300 may be described in the general context of computer executable instructions. Generally, computer executable instructions can include routines, programs, objects, components, data structures, procedures, modules, functions, and the like that perform particular functions or implement particular abstract data types. The computer executable instructions can be stored on a computer readable medium and can be loaded or embedded in an appropriate device for execution. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method, or an alternate method. Additionally, individual blocks may be deleted from the method 300 without departing from the spirit and scope of the subject matter described herein. Furthermore, the method 300 is not restricted to the system 102 and can be implemented in any suitable hardware, software, firmware, or combination thereof. Further, the method 300 may be used to encrypt various types of input data, say, a character, a graphical image, a portion of a graphical image, a sequence of characters, a sequence of graphical images, a voice command, and a portion of a document. For the purpose of explanation, the input data is described with reference to a character, although other data may also be provided as the input data.

At block 302, input data to be encrypted is received. For example, the input data may be received by the user device 104. In one implementation, the data generating module 234 receives input data, say, a character. The data generating module 234 identifies the CNV and glyph associated with the character. Based on the CNV and the glyph, the data generating module 234 generates the character that the user intends to encrypt. The character thus generated is temporarily stored in the user device 104 and not recorded in a document. The character, generated by the user device 104, along with its associated CNV is then provided to a data encryption system, for example, the system 102 for encryption of the character in real-time.

At block 304, the CNV associated with the input data is encoded. In one implementation, the encryption module 218, encodes the CNV, using at least an encoding value, for example, a numerical value to generate an encoded CNV. For example, if the user types the character 'a', the encryption module 218 may encode the CNV, i.e., '97' in case of ASCII codes to any other value, say '120.169800', which now becomes the encoded CNV of the character 'a'.

At block 306, the encoded character numerical value is associated with the glyph, corresponding to the input data. For example, the association module 220 associates the encoded CNV of the input data, say, the character 'a', with the glyph corresponding to the character. In one implementation, the association module 220 uses a dynamic table to associate the CNV with the glyph.

At block 308, the encoded CNV and the glyph are stored. In one implementation, the system 102 stores the encoded CNV and the associated glyph in a storage medium integral or external to the system 102, for example, in the association data 226 or the encryption data 240.

At block 310, the encoded character numerical value is encrypted, for example, using an encryption key. In one implementation, the encryption module 218 encrypts encoded CNV using the encryption key to obtain an encrypted encoded CNV. The encryption module 218, in one embodiment, communicates with the key generator 244 configured to generate the encryption key. The key generator 244 is configured to use any known key generation algorithm to generate the encryption key. The encrypted encoded CNV may then be stored in the encryption data 240. Once the encrypted encoded CNV of the character is generated, a glyph corresponding to the encrypted encoded CNV is recorded in the document as the encrypted character. In one embodiment, in response to input of data, encrypted character is represented in the document. In another implementation, in response to input of the data, the original glyph appears in the document and when the document is accessed again, encrypted character appears in the document. The character is thus encrypted in real-time.

Although embodiments of a data encryption system have been described in language specific to structural features and/or methods, it is to be understood that the invention is not necessarily limited to the specific features or methods described. Rather, the specific features and methods are disclosed as exemplary implementations for the data encryption system.

I claim:

1. A method for real-time encryption of input data, the method comprising:
   encoding a character numerical value associated with the input data to generate an encoded character numerical value, wherein encoding of the character numerical value for each instance of the input data, to be displayed to a user, generates a different encoded character numerical value;
   associating the encoded character numerical value with a glyph using a dynamic table, wherein the dynamic table includes an encoding matrix, an encoding sequence, and the numerical value, and wherein the glyph is associated with the input data;
   storing, in a volatile memory, the encoded character numerical value and the glyph; and
   encrypting, using an encryption key, the encoded character numerical value to obtain an encrypted encoded character numerical value.

2. The method as claimed in claim 1 further comprising:
   receiving the input data from an input device; and
   identifying the character numerical value corresponding to the input data.

3. The method as claimed in claim 1, wherein the encoding comprises:
   assigning an intermediary encoding value corresponding to the character numerical value;
   generating the encoding matrix based on the intermediary encoding value and a relative position of the input data in a document, wherein the relative position of the input data is based on the first occurrence of the input data in the document;
   generating an encoding value based on the encoding matrix and the encoding sequence; and
   encoding the character numerical value based in part on the encoding value.

4. The method as claimed in claim 3, wherein the encoding value is a numerical value.

5. The method as claimed in claim 1, wherein the encoding sequence is at least one of a transcendental number, a series of prime numbers, and a series of random numbers.

6. The method as claimed in claim 1, wherein the glyph corresponds to a typeface of the input data.

7. The method as claimed in claim 1, wherein the input data includes at least one of a character, a graphical image, a portion of a graphical image, a sequence of characters, a sequence of graphical images, and a portion of a document.

8. The method as claimed in claim 1, wherein the encrypting is performed such that on decryption the encoded character numerical value remains encoded and an encrypted representation of the glyph is decrypted to provide the glyph to an authorized user.

9. The method as claimed in claim 1 further comprising:

generating the input data based on the encoded character numerical value and the glyph corresponding to the input data.

10. The method as claimed in claim 1, wherein the associating further comprises identifying the glyph corresponding to a typeface of the input data.

11. The method as claimed in claim 1 further comprising:
receiving a request for selecting a typeface from amongst a plurality of typefaces; and
generating the input data based on the encoded character numerical value and the glyph corresponding to the selected typeface.

12. A system for real-time encryption of input data, the system comprising:
a processor; and
a memory coupled to the processor, the memory comprising,
an encryption module for real-time encryption of the input data, wherein the encryption module is configured to:
encode, using an encoding value, a character numerical value associated with the input data to generate an encoded character numerical value, wherein encoding of the character numerical value for each instance of the input data, to be displayed to a user, generates a different encoded character numerical value;
store, in a volatile memory, the encoded character numerical value and an associated glyph, wherein the glyph is associated with the input data; and
encrypt the encoded character numerical value, using an encryption key and an encryption function, to obtain an encrypted encoded character numerical value; and
an association module configured to associate the encoded character numerical value and the associated glyph in real-time for streaming encryption of the input data real-time using a dynamic table, wherein the dynamic table includes an encoding matrix, an encoding sequence, and the numerical value.

13. The system as claimed in claim 12, wherein the encryption module is further configured to:
assign an intermediate encoding value corresponding to the character numerical value;
generate the encoding matrix based on the intermediate encoding value and a relative position of the input data in a document, wherein the relative position of the input data is based on the first occurrence of the input data in the document; and
generate the encoding value based on the encoding matrix and the encoding sequence.

14. The system as claimed in claim 13, wherein the intermediate encoding value is one of a random value and a pseudo random value.

15. The system as claimed in claim 12, wherein the encoding sequence is at least one of a transcendental number, a series of prime numbers, and a series of random numbers.

16. The system as claimed in claim 12, wherein the encryption module is further configured to encrypt the encoded character numerical value using one of a public key infrastructure and an identity based encryption function.

17. The system as claimed in claim 12, wherein the encryption key is derived from security data obtained from at least one of a smartcard, biometric data, a security identifier (SID), and password protection data.

18. The system as claimed in claim 12, wherein the encryption key is at least one of a symmetric key, an asymmetric public key, an asymmetric private key, and a streaming encryption algorithm key.

19. The system as claimed in claim 12, wherein the encryption module is further configured to provide a decryption key, wherein the decryption key facilitates decryption of the input data to display the glyph associated with the input data.

20. The system as claimed in claim 12, wherein the character numerical value includes at least one of an alphanumeric value, a small discrete unit used by an application for textual and graphical processing, an American standard code for information interchange (ASCII) code, an ANSI code, a packetized communication, and a frame-based transmission.

21. The system as claimed in claim 20, wherein the application for textual and graphical processing includes at least one of an instant messaging application, a short message service application, a multimedia messaging service application, an email application, and a web page based application.

22. The system as claimed in claim 12, wherein the character numerical value is decrypted on at least one of a computing device, a cellular communicating device, and a printing device using a decryption key provided by a user.

23. The system as claimed in claim 12, wherein the encryption module is configured to encrypt characters of textual data associated with an application program in a streaming format.

24. The system as claimed in claim 12, wherein the system is one of a plug-in device, a laptop, a computer, a portable computing device, a personal digital assistant, a smart phone, and a mobile phone.

25. The system as claimed in claim 12, wherein the input data includes at least one of a character, a graphical image, a portion of a graphical image, a sequence of characters, a sequence of graphical images, and a portion of a document.

26. The system as claimed in claim 12, wherein the input data is one of an alphanumeric character, a punctuation mark, and a special character.

27. A non-transitory computer-readable medium having a set of computer readable instructions that, when executed, perform acts comprising:
converting input data to a character numerical value;
encoding the character numerical value using an encoding value to generate an encoded character numerical value, wherein encoding of the character numerical value for each instance of the input data, to be displayed to a user, generates a different encoded character numerical value;
associating the encoded character numerical value with a glyph using a dynamic table, wherein the dynamic table includes an encoding matrix, an encoding sequence, and the numerical value, and wherein the glyph is associated with the input data
storing, in a volatile memory, the encoded character numerical value and the glyph; and
encrypting the encoded character numerical value using an encryption key to obtain an encrypted encoded character numerical value, wherein the encryption is performed before the input data is recorded in a document.

28. The non-transitory computer-readable medium as claimed in claim 27, further comprising a set of computer readable instructions that, when executed, perform acts comprising:
decrypting the encrypted encoded character numerical value, on receiving a decryption key, to obtain the glyph; and
providing the input data associated with the glyph, wherein the input data is obtained using the encoded character numerical value.

29. The non-transitory computer-readable medium as claimed in claim 27, further comprising a set of computer readable instructions that, when executed, perform acts comprising:
- decrypting the encoded character numerical value on receiving a read request from a user, wherein no decryption key is required for the decryption;
- obtaining identification details corresponding to the user; and
- providing the input data, wherein the input data is obtained using the encoded character numerical value.

30. The non-transitory computer-readable medium as claimed in claim 27, further comprising a set of computer readable instructions that, when executed, perform acts comprising:
- providing full digital rights management control over a plurality of devices connected to the computer-readable medium.

31. The non-transitory computer-readable medium as claimed in claim 30, wherein full digital rights include at least one of a copy, paste, drag, drop, and print.

32. The non-transitory computer-readable medium as claimed in claim 27, wherein the encoding further comprises a set of computer readable instructions that, when executed, perform acts comprising:
- assigning an arbitrary value corresponding to the character numerical value;
- generating the encoding matrix based on the arbitrary value and relative position of the input data in the document, wherein the relative position of the input data is based on the first occurrence of the input data in the document;
- generating the numerical value based on the encoding matrix and the encoding sequence; and
- encoding the character numerical value with the numerical value.

33. The non-transitory computer-readable medium as claimed in claim 27, wherein the input data includes at least one of a character, a graphical image, a portion of a graphical image, a sequence of characters, a sequence of graphical images, and a portion of a document.

34. The non-transitory computer-readable medium as claimed in claim 27, wherein the input data includes a plurality of sections, and wherein at least two sections selected from amongst the plurality of sections are encrypted in different typefaces.

35. The non-transitory computer-readable medium as claimed in claim 27, wherein the input data includes a plurality of sections, and wherein at least two sections selected from amongst the plurality of sections are encrypted using different encryption keys.

* * * * *